United States Patent [19]
Tanner

[11] 3,958,542
[45] May 25, 1976

[54] THROTTLE CONTROL APPARATUS USING PEDAL RESISTANCE

[75] Inventor: James L. Tanner, Reseda, Calif.

[73] Assignee: Tanner Electronics Systems Technology, Northridge, Calif.

[22] Filed: Mar. 18, 1974

[21] Appl. No.: 452,235

[52] U.S. Cl. .............................. 123/103 E; 180/108
[51] Int. Cl.² ......................................... F02D 11/08
[58] Field of Search ....... 74/514; 123/103 R, 103 F, 123/103 C; 180/108

[56] References Cited
UNITED STATES PATENTS

| | | | |
|---|---|---|---|
| 2,157,652 | 5/1939 | Merriman | 123/103 E |
| 2,519,859 | 8/1950 | Teetor | 123/103 E |
| 2,585,814 | 2/1952 | McDonald | 123/103 R |
| 2,692,980 | 10/1954 | Platt | 123/103 C X |
| 2,825,418 | 3/1958 | Kershman | 74/514 X |
| 2,853,985 | 9/1958 | Landrum | 123/103 C |
| 3,114,427 | 12/1963 | Thorner | 123/103 R X |
| 3,155,188 | 11/1964 | Stoltman | 123/103 C X |
| 3,388,765 | 6/1968 | Sheppard | 180/108 |

FOREIGN PATENTS OR APPLICATIONS

| | | | |
|---|---|---|---|
| 403,476 | 12/1933 | United Kingdom | 180/108 |

*Primary Examiner*—Charles J. Myhre
*Assistant Examiner*—William C. Anderson
*Attorney, Agent, or Firm*—Jessup & Beecher

[57] ABSTRACT

An auxiliary apparatus or device for attachment to an internal combustion engine, so that at a certain point in the depression of the accelerator pedal, an increased resistance to further depression of the pedal is abruptly encountered. This point is constantly adjusted in accordance with the engine vacuum so that when engine vacuum is high, considerable depression of the pedal is permitted before the resistance is encountered, and conversely when the engine vacuum is low, the resistance point is soon encountered. This is effected by attaching one end of a cable to the throttle mechanism of the engine and attaching the other end to a vacuum actuated bellows. When the slack in the cable is taken up, added resistance is provided in the form of a loading spring, which requires increased foot pressure against the accelerator to overcome. The position at which this added foot pressure is encountered is dependent on the vacuum in the bellows, connected to the intake manifold of the engine, which determines how much slack there will be in the cable before the added resistance point is encountered by the throttle linkage.

10 Claims, 2 Drawing Figures

THROTTLE CONTROL APPARATUS USING PEDAL RESISTANCE

BACKGROUND OF THE INVENTION

With the present shortage of gasoline available for operation of automobiles, it is becoming increasingly important that internal combustion engines and specifically those which drive automobiles and trucks be operated at optimum efficiency, i.e. with maximum reasonably obtainable miles per gallon. It has long been known that the efficiency of an engine is directly, although not necessarily linearly, related to the vacuum in the intake manifold at any given moment. Thus many sophisticated drivers have taken to installing a manifold vacuum gauge on the dash instrument panel of their automobile which they observe closely. As long as the vacuum indicated is above a certain minimum value, typically around 10 to 12 inches of mercury, the driver knows that (with a typical engine) he is operating in a range of good gas economy. When the vacuum needle drops below that point, he knows that his gas mileage has, at that instant of operation, dropped off markedly.

SUMMARY OF THE PRESENT INVENTION

The present invention provides an easily installed and adjusted mechanism by which the resistance that the driver encounters with his foot as he depresses the accelerator pedal tells him that he has reached the limit of his good operating range and that he is about to drive the engine into low vacuum range where gas mileage is poor. This is done in accordance with the present invention by attaching a flexible line to some portion of the throttle actuating linkage and adjusting the line in accordance with engine vacuum. Thus when the vacuum drops to a certain adjustable point, further depression of the gas pedal will encounter greatly increased resistance, thereby indicating to the driver by the pressure at his pedal foot, that he is at the limit of the efficient operating range of his engine. If he chooses, for any reason, as for example in an emergency, he may readily drive into this range simply by increasing the pressure on the pedal, and once the emergency is passed, he may back off until he re-enters the range of normal foot pedal resistance, which assures him that he is then back in the region of optimum gas performance.

DETAILED DESCRIPTION OF THE INVENTION

Figure 1:
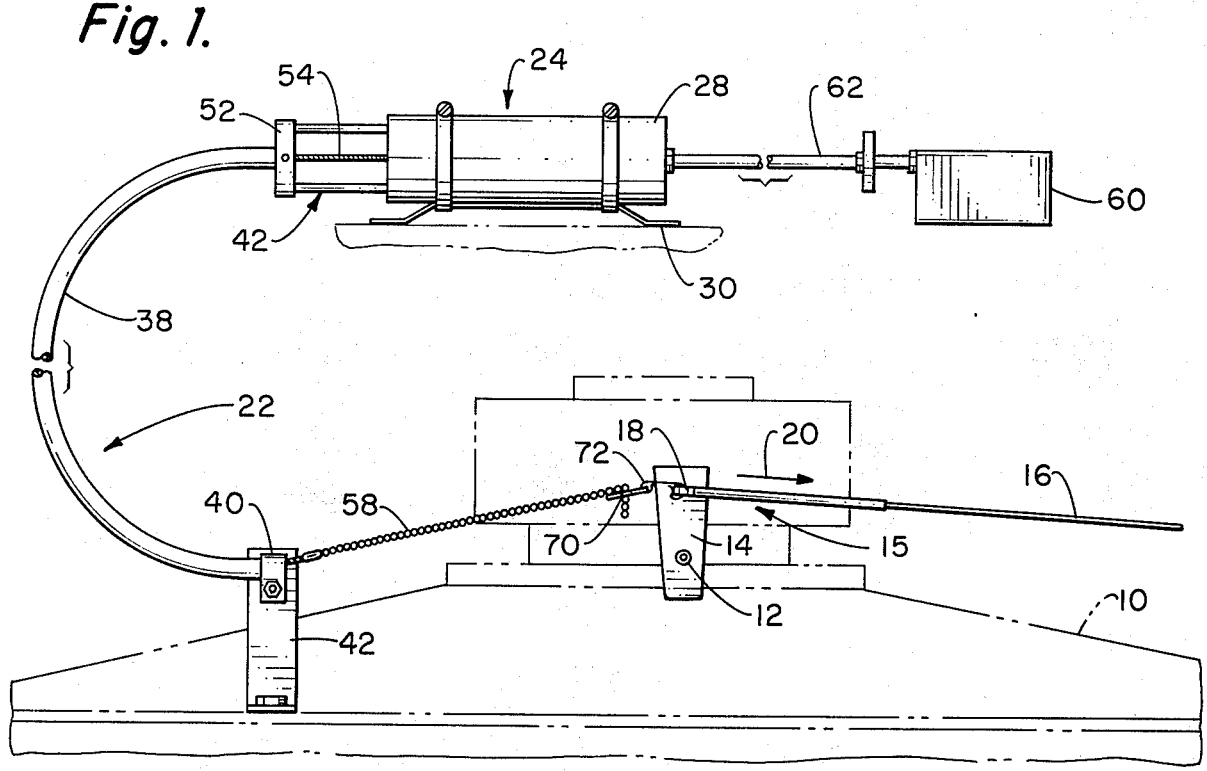
FIG. 1 is an illustration of the apparatus of the present invention installed in an automobile engine.
Figure 2:
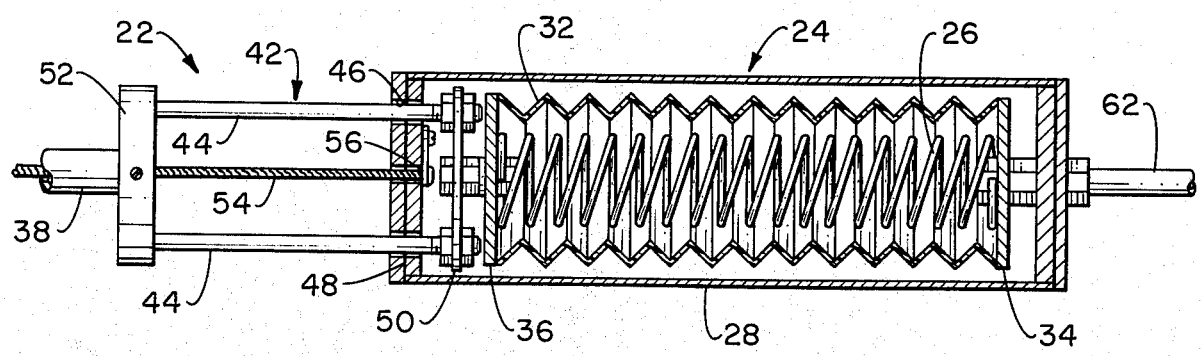
FIG. 2 is a sectional view of the vacuum control portion of the apparatus.

In the drawings, 10 represents an internal combustion engine, such as would be mounted, for example, under the hood of an automobile. The engine throttle (not shown), in conventional fashion is connected to a shaft 12 oscillated back and forth by a crank arm 14 forming part of a throttle actuating linkage 15. The linkage 15 also includes rod 16 pivotally connected at 18 to the arm 14, the remote end of which is actuated by the conventional foot pedal or accelerator (not shown).

In the drawing, when the accelerator pedal is being steadily pushed down by the foot of the driver, the pivot 18 between the rod 16 and the arm 14 moves to the right in the direction of the arrow 20, and the throttle moves steadily from closed position to open position.

In accordance with the present invention, it is desired that as the throttle is moved steadily from throttle closed to throttle open position, a point be encountered at which further throttle open movement of the rod 16 encounters greatly increased resistance, i.e. the resistance abruptly increases over and above the normal return spring bias conventionally applied to the shaft 12. This resistance is provided in the present invention by the provision of a flexible line, shown generally at 22, one end of which is secured to linkage pivot 18 and the other end of which arcs around and is secured to a vacuum means, shown generally at 24, which is responsive to engine vacuum to move the point at which increased resistance is encountered. Thus upon increase in engine vacuum, the resistance point is encountered closer to the throttle open position of the linkage 15, and when the engine vacuum decreases, the point of added resistance is encountered closer to the throttle closed position of the linkage 15. Also included in the resistance means is a spring 26 mounted within the vacuum means 24, which is placed under increasing stress, in this case compression, as the linkage 15 is operated past the peselected resistance point toward throttle open position.

The vacuum means 24 comprises a housing 28 mounted at a convenient position on the engine or automobile frame by a bracket 30. Within the housing 28 is an elongate, expandable bellows 32, one end wall 34 of which is fixedly mounted to the housing 28 and thus fixedly mounted with respect to the engine frame. The other end wall 36 of the bellows 32 constitutes a vacuum operated actuating member, to which is secured one end of the flexible line 22.

The flexible line 22 comprises a flexible sheath 38, one end of which is clamped at 40 to a bracket 32 secured to the engine or automobile frame. The other end of the sheath 38 is secured to the end wall 36 of the bellows 32 by means of a frame 42, consisting of a pair of guide rods 44 which reciprocate back and forth in openings 46 formed in the end wall 48 of the housing 28. The rods 44 are connected to a crossbar 50 which is in turn secured to the end wall 36. Another crossbar 52 serves to connect the other end of the rods 44 to the flexible sheath 38. The flexible line 22 also includes a cable or wire 54 slideable back and forth within the sheath 38. One end of the wire 54 emerges from the sheath 38 at the vacuum member 24 and is secured to the end wall 48 of the housing 28, as shown at 56. The other end of the cable 54 emerges from the other end of the sheath, adjacent the clamping point 40, and is connected at the pivot 18 to the throttle linkage 15, so as to be moved as shown by the arrow 20 when the accelerator pedal is depressed. This end of the cable 54 preferably consists of a bead chain 58, so as to provide great flexibility and allow the cable to easily go slack under certain conditions, as will be discussed hereinafter.

The interior of the bellows 32 is connected to the intake manifold of the engine, shown schematically at 60, by a vacuum conduit or hose 62. The spring 26 is disposed longitudinally within the bellows 32 and is compressed between the walls 34 and 36. As will be more apparent hereinafter, the spring 26 serves the double function of providing the added resistance to further movement of the foot pedal or accelerator once a certain point has been reached, and also of biasing the bellows 32 toward expanded condition against the force of the vacuum in the line 62.

It will be readily seen that the bead chain portion 58 of the cable 54 will go slack when either or both of two things occur. First, if the vacuum in the manifold 60 increases, the bellows 32 will contract. This will move the frame 42 inward in the housing 28 and tend to flatten the arc in the sheath 38 extending between the housing 28 and the bracket 42. Since the end 56 of the wire 54 is fixed to the housing 28, the wire 54 will slide within the sheath 38 in the direction of the bracket 42 and thus more wire or cable 54 will emerge from the sheath 38 at the end 40. The result will be to provide slack or more slack in the chain 58.

Secondly, slack may also be provided by moving the throttle rod 16 toward the throttle closed position, i.e. simply by letting off on the foot throttle or accelerator. It is the interplay between these two operations, i.e. operation of the accelerator pedal and operation of the bellows 32 by engine vacuum, that brings about the optimization of fuel consumption which is the desideratum of the present invention.

Since adjustments are, of course, necessary for each particular installation, means are provided for readily adjusting the length of the cable 54 and more particularly the length of the bead chain section 58 extending between the sheath 38 and the throttle linkage 15. This adjustment may be done at either end of the chain 58 by simply providing a hook or socket as shown at 70, in which any one of the beads of the chain 58 may be selectively hooked. An expedient way to connect the chain 58 to the throttle linkage 15 is a simple hook 72 forming a link between the pivot point 18 and the attaching member 70 of the bead chain 58.

The apparatus operates as follows:

When the engine is not running, there is no vacuum in the manifold 60 and the bellows 32 is fully expanded by the spring 26. The throttle linkage 15 is in closed position, i.e. the point 18 is at the left of its excursive path. Under this condition the chain 58 will normally have a slight amount of slack, and the apparatus will be exerting no influence whatever on the throttle mechanism or linkage 15. As soon as the engine starts, the buildup of vacuum contracts the bellows 32 and provides more slack in the chain 58. As the automobile driver pushes down on the accelerator, he moves the point 18 to the right and takes up the slack in the chain 58. At the same time, depending on the vigor with which the car is being accelerated, the vacuum in the bellows 32 will be decreasing and this also causes slack to be taken up in the bead chain 58.

Finally, a point is reached where all the slack is taken up. At this point any further depression of the gas pedal will encounter the added resistance of the spring 26. This is because the only way that the chain 58 can be further pulled in the direction of arrow 20, since the end 56 of the wire 54 is fixed to the vacuum frame, is to flatten the arc of the sheath 38, thereby driving the guide rods 44 inward, forcing the end wall or vacuum member 36 inwardly in the housing 28, against the compressive force of the spring 26. The point at which this added resistance is encountered, as the driver depresses the accelerator pedal, may be adjusted to any desired vacuum level where the driver has determined he wants to adjust the mechanism.

As noted, the higher the vacuum that is allowed to be maintained, during engine operation, the better will be the gas consumption. Thus the driver, when he encounters the point of abrupt increase in pedal pressure, knows that he is entering into the region of lower manifold vacuum and hence of poorer gas mileage. He may readily do this if he wishes, in the interest of safety, as for example when acceleration is necessary for safe operation of the automobile, but as soon as this condition is passed, he may then back off on the gas pedal until it is just at the boundary position where all the slack has been taken up in the chain 58 but the spring 26 is not being compressed by any tension in the cable 54, forming a portion of the flexible line 22.

In practice, after installation as indicated, the apparatus is adjusted as follows:

It is preferred to attach a vacuum gauge temporarily to the intake manifold so that the vacuum in the bellows 32 can be constantly read from the driver's position. The car is driven onto a clear road and the gas pedal is steadily depressed until the added resistance of the spring 26 is abruptly encountered. At this point the driver knows that all the slack has been taken out of the flexible line 22. For optimum gasoline mileage with most automobiles, the vacuum gauge should read in the range from ten to twelve inches of vacuum. If it reads too low, the car is probably being operated in a region of unreasonably high gas consumption. The car is then stopped and some of the slack in the bead chain 58 is taken out by moving the end which is attached at the hook 70. For most cars and with a typical bead chain, one bead corresponds to about one inch of vacuum adjustment. Conversely, if under this test run, the vacuum reads too high, it may indicate a condition of operation in which reasonable acceleration is being unduly sacrificed to high vacuum, without a commensurate return in gas mileage. In this case the chain 58 should be slackened slightly.

Once adjusted, the driver can drive with confidence that his foot will constantly tell him whether he is in the optimum gasoline consumption range of the engine or whether for reasons which are entirely at his choosing, he is beyond that range and is operating in a region of unduly low vacuum, i.e. poor gas consumption.

It will be noted that the apparatus of the present invention is entirely an appendage to the normal conventional throttle actuating mechanism. The relationship between the engine throttle valve, operated by the shaft 12, and the position of the gas pedal remains completely unchanged. The system is also completely failsafe. If the flexible line 22 or any portion thereof should break, it would simply in effect drop away from the engine and the operation would be the same as before it was ever installed.

Whereas the present invention has been shown and described herein in what is conceived to be the best mode contemplated, it is recognized that departures may be made therefrom within the scope of the invention which is therefore not to be limited to the details disclosed herein but is to be afforded the full scope of the invention.

What is claimed is:

1. Apparatus for affecting control of the throttle actuating mechanism of an internal combustion engine having a throttle actuating linkage steadily movable from a throttle closed position to a throttle open position, and comprising:

resistance means for applying to the linkage, at a predetermined point in its excursion from closed to open position, a resistive force which resists further movement toward open position;

vacuum means responsive to increase in engine vacuum for moving said point so that said point is encountered closer to the throttle open position of the linkage, and responsive to decrease in engine vacuum for moving said point so that said point is encountered closer to the throttle closed position of the linkage;
said resistance means including a flexible line having one end connected to said linkage; and
said vacuum means adapted to move said point by varying the slack in said flexible line.

2. Apparatus in accordance with claim 1 wherein:
said resistance means includes a spring which is placed under increasing stress as said linkage is moved past said point toward throttle open position.

3. Apparatus in accordance with claim 1 wherein:
said vacuum means includes a vacuum member oscillatible back and forth in response to engine vacuum;
said resistance means includes flexible line means having one end secured to the linkage and the other end secured to said member to form an arc;
the slack in said line means being taken up at one end by movement of said vacuum member in response to decrease in engine vacuum, and at the other end by movement of the linkage toward throttle open position.

4. Apparatus in accordance with claim 3 wherein:
said resistance means includes a spring which is placed under increasing stress as said linkage is moved past said point toward throttle open position, and which also biases said vacuum member against the force of the engine vacuum.

5. Apparatus in accordance with claim 1 wherein:
the other end of said flexible line is fixedly attached; and including
coupling means coupling said flexible line to said vacuum means whereby said flexible line may be loosened or tightened according to the vacuum in said vacuum means.

6. Apparatus in accordance with claim 5 wherein said coupling means is a sheath surrounding said flexible line and said flexible line and said sheath are formed into an arc whereby said vacuum means varies said arc, thus loosening or tightening said flexible line.

7. Apparatus according to claim 1 wherein said flexible line includes means for adjusting the resistance point varied by said vacuum means.

8. Apparatus according to claim 7 wherein said means for adjusting said resistance point comprises a bead chain attached to said throttle linkage which may be removably attached to a slot for varying the length of said bead chain.

9. In combination with an internal combustion engine having an intake manifold and a throttle actuating linkage steadily movable from a throttle closed position to a throttle open position,
a bellows having one end mounted fixedly with respect to said engine;
a vacuum conduit communicating between said manifold and the interior of said bellows;
a flexible line connected to and arcing around between the other end of said bellows and said linkage, and comprising a flexible sheath having one end fixed with respect to said engine, but spaced from said linkage, and the other end secured to the other end of said bellows, and a cable slideable within said sheath having one end emerging from said sheath and secured to said linkage and the other end emerging from said sheath and fixed with respect to said engine;
a spring biasing said bellows to expanded condition against the vacuum of said manifold;
whereby movement of said linkage toward throttle open position steadily takes up the slack in that portion of said cable between said one end of said sheath and said linkage, until a point is reached where further such movement causes said bellows to contract against the bias of said spring.

10. The combination of claim 9 wherein:
said cable portion includes a chain and means for adjustably securing one end of said chain so as to adjust the length of chain extending between said one sheath end and said linkage.

* * * * *